Patented Jan. 15, 1929.

1,699,427

UNITED STATES PATENT OFFICE.

ERNST FELLMER, OF LEVERKUSEN, NEAR COLOGNE, GERMANY, ASSIGNOR TO GRASSELLI DYESTUFF CORPORATION, OF NEW YORK, N. Y., A CORPORATION OF DELAWARE.

GREEN DISCHARGEABLE SILK DYESTUFFS.

No Drawing. Application filed August 17, 1925, Serial No. 50,838, and in Germany October 20, 1924.

My invention relates to disazodyestuffs which dye silk green shades and which can be discharged to a pure white.

I have found that disazodyestuffs of the general formula—

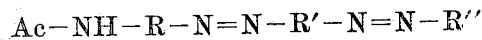
Ac—NH—R—N=N—R′—N=N—R″ in which Ac represents an acidyl residue, R a benzenoid compound, R′ a 2-naphtholether compound and R″ a peri-naphthalene compound in which one of the peri substituents is hydroxyl, the other hydroxyl, amino or acetyl amino, dye silk a wide range of level green shades, which are very fast to washing and can be easily discharged to a clean white. These features make my new products quite valuable in the trade, as no dyestuff was known heretofore which would combine with the shade and fastness on silk of my novel products, the property of being dischargeable to a perfectly clean white.

The process of producing my new dyestuffs consists in diazotizing aromatic monoacidyldiamines, their sulfonic or carboxylic acids, combining the diazo compounds obtained with 1-2-aminonaphtholethers or their sulfonic acids, rediazotizing the mono-azo dye formed and coupling with peri-amino-naphthol-, peridihydroxy-naphthalene-sulfonic acids or their derivatives.

The peculiar, valuable properties of my new dyestuffs are due to the combination of various elements of which the three principal ones seem to be the acidyl-amino group in the first component, the presence of an alkoxy group in beta position to the diazotized alpha amino group of the second component and the peri substitution in the end component. These three conditions being obtained, the composition of the dyestuffs can be varied in rather wide limits without departing from the spirit of my invention. As first components, products such as acidylphenylene or naphthylenediamine compounds can be used and I might mention the following: 4-acetylamino-1-aniline-2-sulfonic acid, m-aminoacetanilid, p-aminoacetanilid, 3-acetylamino-1-aniline-6-sulfonic acid, 3-acetylamino-1-aniline-6-carboxylic acid, benzoyl-p-phenylenediamine-o-sulfonic acid, 4-oxalylamino-1-aniline-3-sulfonic acid, p-diamino-diphenylurea, p-diamino-diphenylurea-disulfonic acid, 4-acetyl-naphthylenediamine, 4-acetyl-naphthylenediamine-7-sulfonic acid, 4-acetyl-naphthylenediamine-2-6-disulfonic acid, etc. As middle components useful in my invention I will particularly mention 1-amino-2-naphthol alkyl ethers, especially the methyl and ethyl ethers, their 6- and 7-sulfonic acids. The end components which come within the scope of my invention are the 1-8-dihydroxynaphthalene sulfonic acids, 1-8-amino-naphthol sulfonic acids, 1-acidyl-amino-8-naphthol sulfonic acids, and more particularly the peri-substituted 4-naphthalene sulfonic acids. The acidyl group in the first components is of the type acetyl, benzoyl, oxalyl, etc., and includes also the urea group as mentioned above amongst the specific products usable as first components.

My new dyestuffs are general dark grey to greenish-black powders easily soluble in water with greenish-blue colors, soluble in concentrated sulfuric acid with blue to greenish-black colors. They are split up by reduction, as for instance with stannous chloride or zinc and hydrochloric acid into an aromatic diamino compound, a 1-4-diamino-2-naphthol ether compound and into a peri-substituted-naphthylamine sulfonic acid.

In order to further illustrate my invention the following examples are given:

*Example 1.*—23 parts 4-acetylamino-1-aniline-2-sulfonic acid are dissolved in water with with the requisite amount of soda ash, the solution is cooled with ice to about 10° C. and diazotized by the addition of 35 parts commercial hydrochloric acid and 6.9 parts sodium nitrite. The diazo solution is then run into a water solution of 26.7 parts 1-amino-2-naphtholethylether-6-sulfonic acid containing an excess sodium acetate. The coupling product separates, is filtered off, made into a paste with water and transformed into the sodium salt by the addition of 56 parts 16% caustic soda. It is then diazotized by the addition of 69 parts commercial hydrochloric acid and 6.9 parts sodium nitrite; the difficultly soluble diazo compound is salted out, filtered off, again made into a paste with water and coupled in sodium carbonate solution with 24 parts 1-8-acetyl-amino-naphthol-4-sulfonic acid. The coupling is run until no more of the free components can be detected; the dye-stuff is then salted out, filtered and dried. It is a dark powder, soluble in water with a greenish-blue color, soluble in concentrated sulfuric acid with a blue color. It has in the free state most probably the formula—

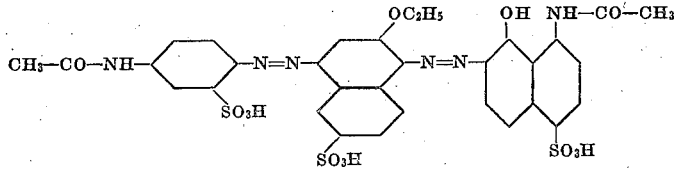

It is split up by reduction with stannous chloride and hydrochloric acid into a para-phneylenediamine sulfonic acid compound 1-4-diamino-2-naphthol-ethylether-6-sulfonic acid and an amino-1-8-amino-naphthol-4-sulfonic acid compound.

It dyes silk level green shades, particularly fast to washing and dischargeable, as for instance with hydrosulfite compounds, to a perfectly clean white.

Example 2.—26 parts 4-oxalyl-p-phenylenediamine-3-sulfonic acid are dissolved in water with the requisite amount of soda ash, cooled with ice to about 10° C. and diazotized by the addition of 35 parts commercial hydrochloric acid and 6.9 parts sodium nitrite. The diazo solution is added to a solution of 18.7 parts 1-2-amino-naphthol-ethylether in dilute sulfuric acid and then an excess of sodium acetate solution is run in to allow the coupling to proceed. The reaction product is then made acid to Congo red and the mono-azo dye which separates is filtered off. It is then made into a paste with water, 30–35 parts 16% caustic soda solution and 10% salt; after cooling to 10–15° C. the product is rediazotized by the addition of 70 parts commercial hydrochloric acid and 6.9 parts sodium nitrite. The diazo obtained is coupled in sodium carbonate solution with 28.1 parts 1-8-acetylamino-naphthol-4-sulfonic acid, the dyestuff is then isolated in the usual way.

It is a dark greenish powder, soluble in water with a greenish-blue color, soluble in concentrated sulfuric acid with a blue color. It dyes silk level, bright bluish-green fast shades which are easily discharged to a clean white.

It has in the free state most probably the formula—

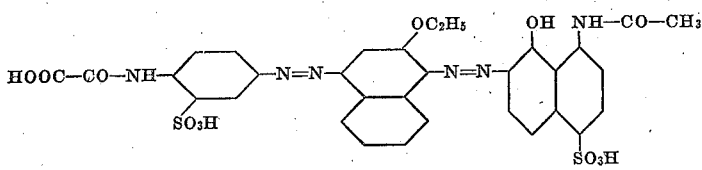

It is, by reduction with stannous chloride and hydrochloric acid split up into a para-phenylenediamine-sulfonic acid compound, 1-4-diamino-2-naphthol ether, and an amino-1-8-amino-naphthol-4-sulfonic acid compound.

Example 3.—18 parts p-phenylenediamine oxaminic acid are dissolved in water with the requisite amount of soda ash and diazotized at about 10° C. by the addition of 35 parts commercial hydrochloric acid and 6.9 parts sodium nitrite. 26.7 parts 1-2-amino-naphthol ethyl ether-6-sulfonic acid are dissolved in water and an excess of sodium acetate added. The diazo solution is now added to the amino-naphthol ether solution and agitated until coupling is complete. The mono-azo product is isolated as the sodium salt, it is made into a paste with water and diazotized at 15–18° C. with 69 parts hydrochloric acid and 6.9 parts sodium nitrite. The diazo solution is combined with an acetic acid solution of 24 parts 1.8-dihydroxynaphthalene-4-sulfonic acid. The dyestuff is isolated in the usual manner. It is a dark greenish powder, soluble in hot water with a bluish-green color, soluble in concentrated sulfuric acid with a greenish-black color, and dyeing silk dark green shades, which can be easily discharged to a pure white. In the free state the dyestuff has most probably the formula

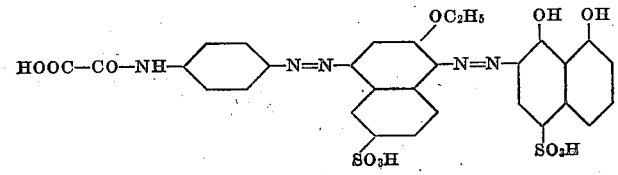

and by reduction, as with zinc and hydrochloric acid, it yields a p-phenylenediamine compound, 1-4-diamino-2-naphtholethylether-6-sulfonic acid and 1.8-dihydroxy-2-naphthylamine-4-sulfonic acid.

*Example 4.*—28 parts 1-4-acetylnaphthylenediamine-6-sulfonic acid are dissolved in water with the requisite amount of soda ash, and diazotized at about 10° C. with 35 parts commercial hydrochloric acid and 6.9 parts sodium nitrite. The diazo is then coupled with a water solution of 26.7 parts 1-2-aminonaphtholethylether-6-sulfonic acid containing an excess of sodium acetate. The solution of the mono-azo product is then directly diazotized by the addition of an excess hydrochloric acid and 6.9 parts sodium nitrite, and coupled with a sodium carbonate solution of 24 parts acetyl-1-8-amino-naphthol-4-sulfonic acid. The dyestuff is isolated in the usual way. It is a dark greenish powder, soluble in water with a bluish-green color, soluble in concentrated sulfuric acid with a violet-blue color and it dyes silk greenish-grey shades, which are easily discharged to a pure white.

It has in the free state most probably the formula—

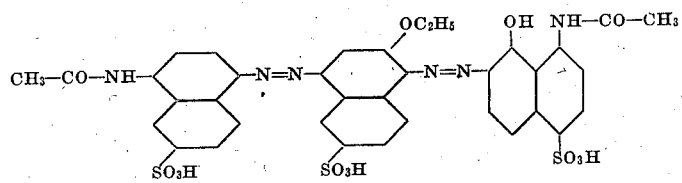

It yields, by reduction, as for instance with zinc and hydrochloric acid, a 1-4-naphthylenediamine-6-sulfonic acid compound, 1-4-diamino-2-naphthol-ethylether-6-sulfonic acid and a diamino-8-naphthol-4-sulfonic acid compound.

I claim:

1. In processes of making green, dischargeable silk dyestuffs the steps comprising diazotizing an aromatic mono-acidyl-diamino compound, coupling the diazo obtained with a 1.2-amino-naphthol alkyl ether compound, rediazotizing the amino-azo-compound obtained, coupling it with a peri-substituted naphthalene compound in which one of the peri substituents is hydroxyl, the other either hydroxyl, amino or acidylamino, and recovering the dyestuff formed.

2. In processes of making green, dischargeable silk dyestuffs the steps comprising diazotizing an aromatic mono-acidyl-diamino acid compound, in which the acid group is either sulfo or carboxyl, coupling the diazo obtained with a 1.2-amino-naphthol alkyl ether sulfonic acid, rediazotizing the amino-azo compound obtained, coupling it with a peri-substituted naphthalene sulfonic acid, in which one of the peri substituents is hydroxyl, the other either hydroxyl, amino or acidylamino, and recovering the dyestuff formed.

3. In processes of making green dischargeable silk dyestuffs the steps comprising diazotizing an aromatic mono-acidyl-diamino compound, coupling the diazo obtained with a 1-2-aminonaphthol alkyl ether-sulfonic acid, rediazotizing the amino-azo compound obtained, coupling it with a peri substituted naphthalene-4-sulfonic acid, in which one of the peri substituents is hydroxyl, the other either hydroxyl, amino or acidyl amino, and recovering the dyestuff formed.

4. In processes of making green, dischargeable silk dyestuffs the steps comprising diazotizing a mono-acidyl-diamino compound of the benzene series, coupling the diazo obtained with a 1-2-amino-naphthol alkyl-ether-6-sulfonic acid, rediazotizing the amino-azo compound obtained, coupling it with a peri substituted naphthalene-sulfonic acid, in which one of the peri substituents is hydroxyl, the other either hydroxyl, amino or acidylamino, and recovering the dyestuff formed.

5. In processes of making a green, dischargeable silk dyestuff the steps comprising diazotizing 4-acetylamino-1-aniline-2-sulfonic acid, coupling the diazo obtained with 1-2-aminoethyl-ether-6-sulfonic acid, rediazotizing the amino-azo compound obtained, coupling it with 1-8-acetylamino-naphthol-4-sulfonic acid, and recovering the dyestuff formed.

6. As new products disazodyestuffs of the general formula—

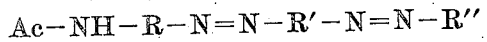

in which Ac represents an acidyl radicle, R an aromatic compound, R′ a 2-naphtholether compound and R″ a peri substituted naphthalene compound, in which one of the peri substituents is hydroxyl, the other either hydroxyl, amino or acidylamino, which dyestuffs are generally dark grey to greenish-black powders, soluble in water with greenish-blue colors, soluble in concentrated sulfuric acid with blue to greenish-black colors, dyeing silk level, green shades, particularly fast to washing and easily discharged to a clean white, and which by reduction are split up into an aromatic diamino compound, a 1-4-diamino-2-naphtholether compound and a peri substituted amino-naphthalene compound in which one of the peri-substituents is hydroxyl, the other either hydroxyl, amino or acidylamino.

7. As new products disazodyestuffs of the general formula—

$$Ac-NH-R-N=N-R'-N=N-R''$$

in which Ac represents an acidyl radicle, R an aromatic acid radicle, in which the acid group is either sulfo or carboxyl, R' a 2-amino-naphthol-alkyl-ether sulfonic acid and R'' a peri-substituted naphthalene sulfonic acid, in which one of the peri-substituents is hydroxyl, the other either hydroxyl, amino or acidyl amino, which dyestuffs are in form of their sodium salts generally dark grey to greenish-black powders soluble in water with greenish-blue colors, soluble in concentrated sulfuric acid with blue to greenish-black colors, dyeing silk level, green shades, particularly fast to washing and easily discharged to a clean white, and which by reduction are split up into an aromatic diamino acid compound, in which the acid group is either sulfo- or carboxyl, a 1-4-diamino-naphthol-ether sulfonic acid and a peri substituted amino-naphthalene sulfonic acid, in which one of the substituents is hydroxyl, the other either hydroxyl, amino or acidylamino.

8. As new products disazodyestuffs having in the free state most probably the general formula

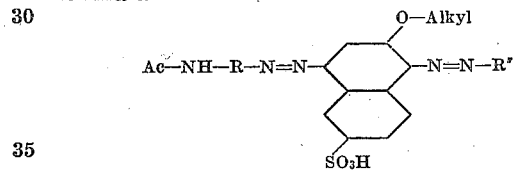

in which Ac is an acidyl radicle, R an aromatic compound and R'' a peri-substituted naphthalene-4-sulfonic acid, in which one of the peri-substituents is hydroxyl, the other either hydroxyl, amino or acidylamino, which dyestuffs are in the form of their sodium salts generally dark grey to greenish-black powders, soluble in water with greenish-blue colors, soluble in concentrated sulfuric acid with blue to greenish-black colors, dyeing silk level, green shades, particulary fast to washing and easiy discharged to a clean white and which by reduction are split up into an aromatic diamino compound, 1-4-diamino-2-naphthol-alkylether-6-sulfonic acid and a peri-substituted amino naphthalene-4-sulfonic acid in which one of the peri-substituents is hydroxyl, the other either hydroxyl, amino or acidyl amino.

9. As new products disazodyestuffs, having in the free state most probably the general formula—

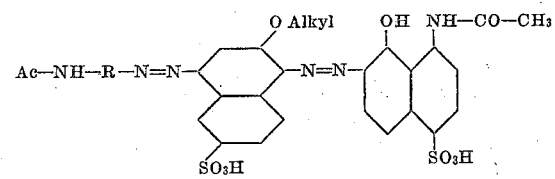

in which Ac is an acidyl radicle, R a compound of the benzene series, which dyestuffs are in the form of their sodium salts generally dark grey to greenish-black powders, soluble in water with greenish-blue colors, soluble in concentrated sulfuric acid with blue to greenish-black colors, dyeing silk level, green shades, particulary fast to washing and easily discharged to a clean white and which by reduction are split up into a diamino-compound of the benzene series, 1-4-diamino-2-naphthol-alkylether-6-sulfonic acid and an amino-1-amino-8-naphthol-4-sulfonic acid compound.

10. As a new product the dyestuff having in the free state most probably the formula

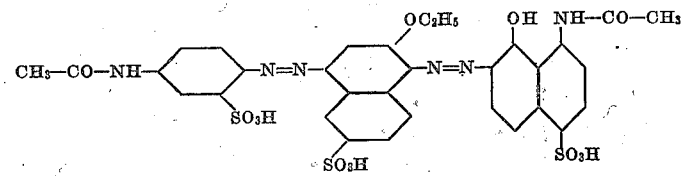

which dyestuff is in the form of its sodium salts a dark powder, soluble in water with a greenish-blue color, soluble in concentrated sulfuric acid with a blue color, dyeing silk level, bright green shades, particularly fast to washing and easily discharged to a clean white, and which by reduction is split up into a paraphenylenediamine-sulfonic acid compound, 1-4-diamino-2-naphtholethylether-6-sulfonic acid and an amino-1-8-aminonaphthol-4-sulfonic acid compound.

In testimony whereof I have hereunto set my hand.

ERNST FELLMER.